United States Patent
Wan et al.

(10) Patent No.: US 8,180,867 B2
(45) Date of Patent: May 15, 2012

(54) CONFIGURATION MANAGEMENT SYSTEM FOR POWER MONITORING AND PROTECTION SYSTEM DEVICES

(75) Inventors: Steven Wan, Victoria (CA); Art Wynans, Victoria (CA)

(73) Assignee: Schneider Electric USA, Inc., Palatine, IL (US)

( * ) Notice: Subject to any disclaimer, the term of this patent is extended or adjusted under 35 U.S.C. 154(b) by 331 days.

(21) Appl. No.: 12/220,840

(22) Filed: Jul. 29, 2008

(65) Prior Publication Data
US 2010/0031076 A1    Feb. 4, 2010

(51) Int. Cl.
G06F 15/16 (2006.01)
G06F 15/177 (2006.01)
G06F 15/173 (2006.01)
G06F 1/00 (2006.01)

(52) U.S. Cl. ......... 709/221; 709/217; 709/223; 713/300

(58) Field of Classification Search .......... 709/217–226; 714/3, 4
See application file for complete search history.

(56) References Cited

U.S. PATENT DOCUMENTS

| | | | | |
|---|---|---|---|---|
| 2002/0120723 A1* | 8/2002 | Forth et al. | ..... | 709/221 |
| 2004/0138834 A1* | 7/2004 | Blackett et al. | ..... | 702/62 |
| 2005/0182979 A1* | 8/2005 | Gross et al. | ..... | 713/300 |
| 2006/0211400 A1* | 9/2006 | Bauman et al. | ..... | 455/343.1 |
| 2007/0006180 A1* | 1/2007 | Green et al. | ..... | 717/136 |
| 2007/0014313 A1* | 1/2007 | Bickel et al. | ..... | 370/503 |
| 2007/0066297 A1* | 3/2007 | Heidari-Bateni | ..... | 455/423 |
| 2007/0096942 A1* | 5/2007 | Kagan et al. | ..... | 340/870.02 |
| 2007/0263643 A1 | 11/2007 | Wadhawan | ..... | 370/401 |
| 2008/0075019 A1* | 3/2008 | Petras | ..... | 370/254 |
| 2008/0148180 A1* | 6/2008 | Liu et al. | ..... | 715/800 |
| 2009/0070447 A1* | 3/2009 | Jubinville et al. | ..... | 709/223 |

OTHER PUBLICATIONS

ION 7500 / ION 7600 Rmican-Seal Checklist, 4 pages dated Apr. 28, 2006.
ION 7300 / ION 7330 Rmican-Seal Checklist, 2 pages dated Apr. 28, 2006.
ION 62 Rmican-Seal Checklist, 1 page dated Apr. 28, 2006.
ION 8600 Rmican-Seal Checklist, 5 pages dated Apr. 28, 2006.
ION 8300 / ION 8400 Rmican-Seal Checklist, 5 pages dated Apr. 28, 2006.
ION 7550 / ION 7650 Rmican-Seal Checklist, 4 pages dated Nov. 2006.
Microsoft Office Online: Help and How-to: Find and correct errors in formulas, 2 pages; http://office.microsoft.com; (downloaded Jul. 25, 2008).

(Continued)

*Primary Examiner* — Ian N Moore
*Assistant Examiner* — Jenee Alexander
(74) *Attorney, Agent, or Firm* — Nixon Peabody LLP (57) ABSTRACT

A method of analyzing configuration parameters of IEDs across one or more networks in an electrical system and automatically determines whether any anomalies exist in the configuration parameters for a selected group of IEDs. A list of all IEDs in the electrical system along with configuration templates including firmware and program versions maintained in a master list are stored in central database on a server communicatively coupled to the IEDs through the networks. Configuration parameter values from the IEDs and from any newly added IEDs are scanned and compared against the configuration templates. Anomalies in the parameter values are identified and highlighted to the user, who may decide to accept the anomaly as expected or change the anomalous parameter value for one IED or a group of IEDs. The master list is updated with any user-approved changes to parameter values. Periodic polling of configuration parameters is also supported.

20 Claims, 2 Drawing Sheets

OTHER PUBLICATIONS

Microsoft Office Excel, Search Excel 2003, Creating data cubes using Excel and text files, 6 pages; http://office.microsoft.com; (downloaded Jul. 25, 2008).

Microsoft Office Online: Help and How to: Change how PivotTable or PivotChart data is summarized, 1 page; http://office.microsoft.com; (downloaded Jul. 25, 2008).

Microsoft Office Online: Help and How to: Create a chart from data in a PivotTable report, 1 page; http://office.microsoft.com; (downloaded Jul. 25, 2008).

Microsoft Office Online: Help and How to: About PivotTable and PivotChart source data, 4 pages; http://office.microsoft.com; (downloaded Jul. 25, 2008).

Microsoft Office Online: Help and How to: Ways to customize PivotTable reports, 9 pages; http://office.microsoft.com; (downloaded Jul. 25, 2008).

Microsoft Office Online: Help and How to: Change the layout of a PivotTable report, 2 pages; http://office.microsoft.com; (downloaded Jul. 25, 2008).

TagScanner 5.0 build 524, 2 pages; http://www.xdlab.ru/en/ (downloaded Jul. 25, 2008).

Windows Update, Ten things you may not know about Wikipedia, from Wikipedia, the free encyclopedia, 2 pages; http://en.wikipedia.org/wiki/Windows_Update (downloaded Jul. 25, 2008).

* cited by examiner

CONFIGURATION MANAGEMENT SYSTEM FOR POWER MONITORING AND PROTECTION SYSTEM DEVICES

FIELD OF THE INVENTION

The present invention relates generally to power monitoring and protection systems, and in particular, to a configuration management system for power monitoring and protection system devices.

BACKGROUND OF THE INVENTION

It is very difficult and time-consuming to properly configure a moderately-sized power monitoring system, which may include hundreds of devices that must be configured properly. Each individual device must be configured, one at a time, requiring extensive knowledge by the installer of the particular configuration parameters for each device. It is difficult for the operator to remember all of the proper configuration parameters and associated values, yet very easy for the installer to improperly configure a device or neglect to configure a device at all. In some systems, many devices need to be configured in the same way, but the operator can easily mis-configure one or more of such devices by entering an incorrect configuration parameter value. The installer also has no easy way of determining whether any discrepancies exist among configurations or whether the configuration of any particular device differs from that of any other device. More time can be spent double-checking or verifying the configuration of all of the devices prior to commissioning, and it can take several days to configure properly all of the capable devices as part of commissioning a power monitoring system. Improper or incomplete configuration can result in mis-operation of the power monitoring system.

What is needed is at least an automated method of analyzing configuration parameters of multiple intelligent electronic devices in an electrical system and determining from that analysis any anomalous configuration parameters with minimal or no user interaction. Aspects and embodiments disclosed herein are directed to addressing/solving these and other needs.

SUMMARY OF THE INVENTION

Compared to prior methods of configuring and commissioning a power monitoring system, which can take days to complete, the configuration management system described herein substantially cuts the time for configuring or commissioning a power monitoring system to just a couple of hours.

According to at least some aspects of the present disclosure a method of managing configuration parameters associated with a plurality of intelligent electronic devices in a power monitoring system, includes: storing a list of the plurality of intelligent electronic devices (IEDs) in a database; storing in the database a master list of configuration parameters and their associated parameter values for each of the plurality of IEDs; receiving an indication of a selected configuration parameter; responsive to the receiving, querying the database for the selected configuration parameter to produce a set of the plurality of IEDs each having the selected configuration parameter; automatically analyzing the parameter values associated with the selected configuration parameter for each IED in the set of IEDs to determine whether at least one anomalous parameter value exists for any IED in the set of IEDs; if the automatically analyzing determines that the at least one anomalous parameter value exists, receiving an indication as to whether to modify the at least one anomalous parameter value; and responsive to the indication as to whether to modify the at least one anomalous parameter value being an indication to modify the at least one anomalous parameter value, modifying the at least one anomalous parameter value in the master list to produce a modified parameter value.

The above method can optionally include any combination of the following additional aspects. The at least one anomalous parameter value is determined by comparing each of the parameter values associated with the selected configuration parameter with a corresponding parameter value in a configuration template stored on the database, and, if the corresponding parameter value differs from the parameter value associated with the selected configuration parameter, flagging the associated IED for the selected configuration parameter as having at least one anomalous parameter value. The at least one anomalous parameter value can be determined by determining whether any parameter value for any IED in the set of IEDs differs from other parameter values for other IEDs in the set of IEDs, and, if so, flagging the parameter value that differs as the at least one anomalous parameter value.

Responsive to the indication as to whether to modify the at least one anomalous parameter value being an indication not to modify the at least one anomalous parameter value, the method can further include updating the master list to include an indication that the at least one anomalous parameter value is not an anomalous parameter value. The method can further include communicating the modified parameter value to the associated IED to cause the modified parameter value to be stored in the associated IED. The method can further include displaying on a video display the at least one anomalous parameter value.

The method can further include: communicating a signal over a first network to which at least some of the plurality of IEDs are connected, the signal being formatted according to a first communications protocol supported by the at least some of the IEDs; receiving via the first network responses from the at least some of the IEDs; instructing via the first network the at least some of the IEDs to transmit their configuration parameters and associated parameter values; and receiving via the first network from the at least some of the IEDs their configuration parameters and associated parameter values. The method can further include: communicating a signal over a second network to which at least others of the plurality of IEDs are connected, the signal being formatted according to a second communications protocol, which differs from the first communications protocol, supported by the at least others of the IEDs; receiving via the second network responses from the at least others of the IEDs; instructing via the second network the at least others of the IEDs to transmit their configuration parameters and associated parameter values; and receiving via the second network from the at least others of the IEDs their configuration parameters and associated parameter values.

The at least one anomalous parameter value can be a plurality of anomalous parameter values, each associated with different ones of the plurality of IEDs. The method can further include: receiving an indication of a second modified parameter value; modifying the master list such that the parameter values for the different ones of the IEDs are modified to correspond to the second modified parameter value; and causing the second modified parameter value to be communicated to each of the different ones of the IEDs. The method can further include, responsive to the causing the second modified parameter value to be communicated, interrogating each of the different ones of the IEDs to verify that the parameter value associated with the selected configuration parameter corresponds to the second modified parameter value.

The receiving the indication of the selected configuration parameter can include receiving an indication of a group of IEDs, wherein the set of IEDs includes the group of IEDs. The method can further include periodically polling the plurality of IEDs to receive one or more configuration parameter values and determining whether the received one or more configuration parameter values have changed relative to the master list. The method can further include: detecting whether one or more new IEDs have been added to the power monitoring system, and, responsive to the detecting, receiving new parameter values from the one or more new IEDs; automatically analyzing the new parameter values associated with the selected configuration parameter to determine whether any of the new parameter values are anomalous relative to the parameter values associated with the selected configuration parameter.

The method can further include: storing in the database a list of versions of firmware or software that is in each of at least some of the plurality of IEDs; and automatically determining whether any of the versions of firmware or software are outdated, and, if so, causing a new version of firmware or software to be downloaded to at least one of the plurality of IEDs having an outdated version of the firmware or software.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

DETAILED DESCRIPTION OF THE ILLUSTRATED EMBODIMENTS

Although the invention will be described in connection with certain aspects and/or embodiments, it will be understood that the invention is not limited to those particular aspects and/or embodiments. On the contrary, the invention is intended to cover all alternatives, modifications, and equivalent arrangements as may be included within the spirit and scope of the invention as defined by the appended claims.

Figure 1:
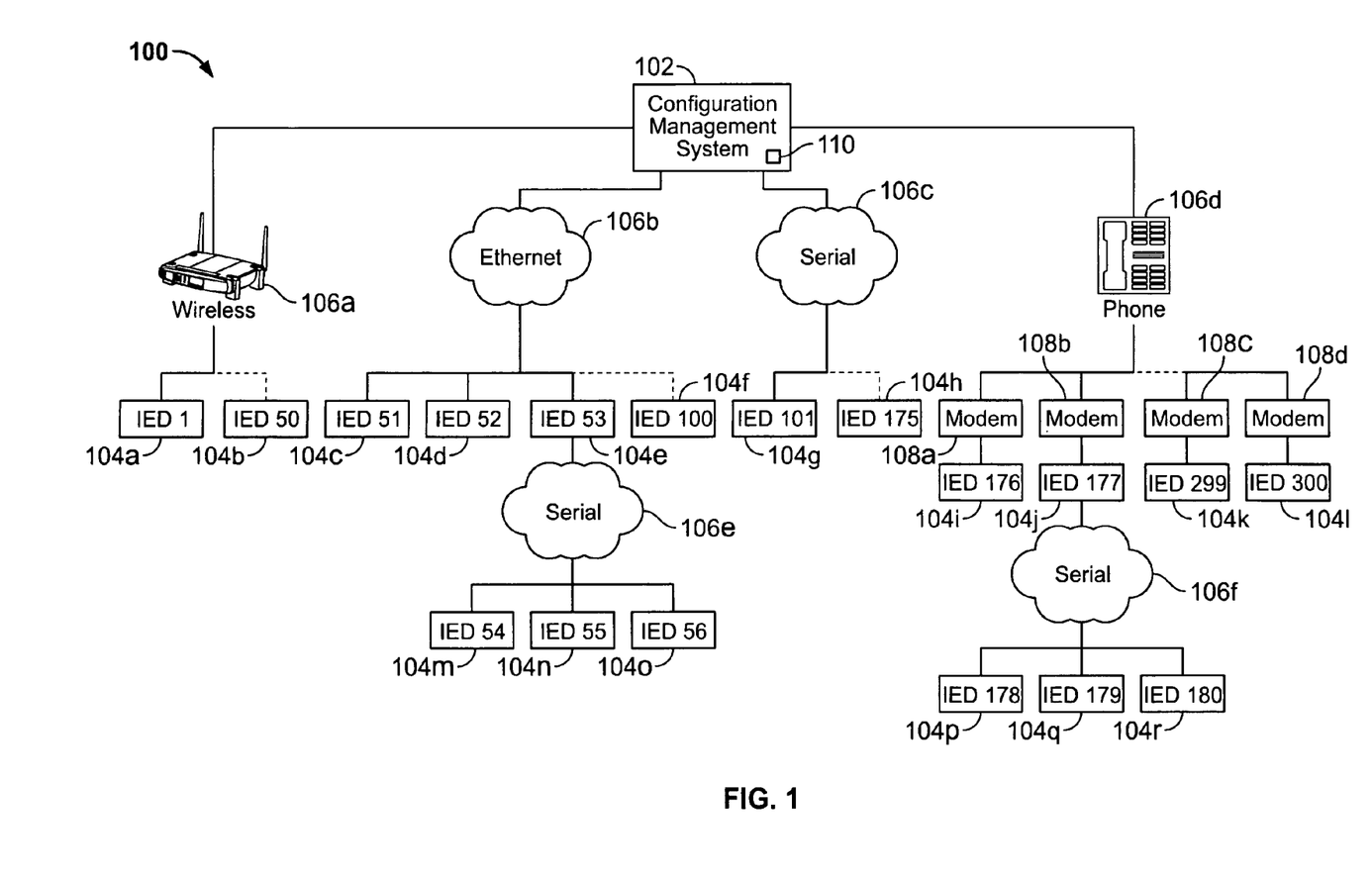
FIG. 1 is a functional block diagram of an exemplary electrical system that includes a configuration management system according to aspects of the present disclosure.

FIG. 1 is a functional block diagram of an electrical system 100 that includes a configuration management system (CMS) 102, which is coupled to intelligent electronic devices (IEDs) 104a-r through various wired and wireless networks 106a-f. IEDs 104a,b are communicatively connected to the CMS 102 via a wireless network 106a. IEDs 104c-f are communicatively connected to the CMS 102 via an Ethernet network 106b. IED 104e serves as a master to IEDs 104m-o, which are communicatively connected to the master IED 104e via a serial network 106e. IEDsg,h are communicatively connected to the CMS 102 via a serial network 106c. IEDs 104i-l are communicatively connected to the CMS 102 via a POTS network 106d. Respective modems 108a-d are connected between the IEDs 104i-l. IED 104j serves as a master to IEDs 104p-r via a serial network 106f. Any one or more of the serial networks 106c,e,f can be MODBUS® or JBUS networks.

As used herein, an IED refers to any system element or apparatus with the ability to sample, collect, or measure one or more operational characteristics (e.g., power, current, voltage, distortion, power factor, energy, demand, harmonics) or parameters of the electrical system 100. For example, the IED may be based on a PowerLogic® Series 3000/4000 Circuit Monitor or a PowerLogic® ION7550/7650 Power and Energy Meter available from Schneider Electric or any other suitable monitoring device (e.g., circuit monitor), a circuit breaker, a relay, a metering device, or a power meter.

Each of the IEDs 104a-r conventionally include configuration parameters, and corresponding parameter values are stored on the IEDs 104a-r. The configuration parameters include any one or more of the following: device type (e.g., a CM3000 circuit monitor), identification information (e.g., TENANTIBUILDING4), unit of measurement, a feature library (e.g., which IED features should be enabled or disabled), pickup and dropout alarm thresholds, user preferences and user-defined quantities, types of data for the IED to log (e.g., energy-related data), IED setup information, IED settings, a threshold of an electrical characteristic (e.g., power, current, voltage, distortion, power factor, energy, demand, harmonics) monitored by the IED, a rated transformer voltage at the IED, alarms, watchdogs, audit events, energy register rollover, pulse width of energy pulse outputs, firmware versions, program versions, communications settings (e.g., baud rate, parity, device address, communications protocol such as MODBUS®, JBUS, or TCP/IP, port number, delay parameters), clock synchronization method (e.g., synchronize to GPS, synchronize to line frequency, synchronize to internal clock), time synchronous source (e.g., COM port, optical port, Ethernet port), time zone offset, daylight savings time offset, standard or custom nameplate information (e.g., owner information, facility information, unique meter tag number, manufacturer serial number), maximum number of metrological (e.g., kWh, kVArh) records to be stored, number of restarts, number of control power failures, date and time information, phase correction factors, calibration information, current transformer (CT) and potential transformer (PT) ratios and other transformer information, the size of datalogs, custom VIPS™ (an IED data aggregation and analysis component available in ION® Enterprise™ energy management software available from Schneider Electric), power demand calculation method (e.g., sliding window, thermal), power demand interval, nominal system frequency, diagnostics, operating mode parameters, peak demand, passwords, and the like. Examples of alarm thresholds include voltage thresholds (e.g., root-mean-square (RMS) values, harmonic components, total harmonic distortion), transient thresholds, and current thresholds (e.g., RMS values, harmonic components, total harmonic distortion). Some configuration parameters can be read only, others can be read/write. The parameter values correspond to a value (which can be numeric, alphanumeric, or any combination of characters) of a configuration parameter. For example, the configuration parameter "device type" can have a parameter value "CM3000." For example, the configuration parameter "nominal system frequency" can have a parameter value "60," which represents a frequency of 60 Hz. As used herein, a "configuration parameter" can include a firmware or software version. Corresponding parameter values of such firmware or software version would include the version number, for example, and the name of the firmware or software.

The CMS 102 includes a storage device 110 (such as a database storage device) on which a master list 114 that describes which firmware or configuration parameter template should correspond to each IED 104a-r. The CMS 102 also stores on the storage device 110 copies of firmware and configuration parameter templates (including their corresponding parameter values) 114 to be deployed to any one or more of the IEDs 104a-r. The CMS 102 also stores on the storage device 110 rules 114 for unattended checking of the IEDs 104a-r and deployment of firmware or parameter values from the configuration parameter template or as entered by the user. The CMS 102 also stores on the storage device 110 a list 112 of the IEDs 104a-r detected in the electrical system 100.

Figure 2:
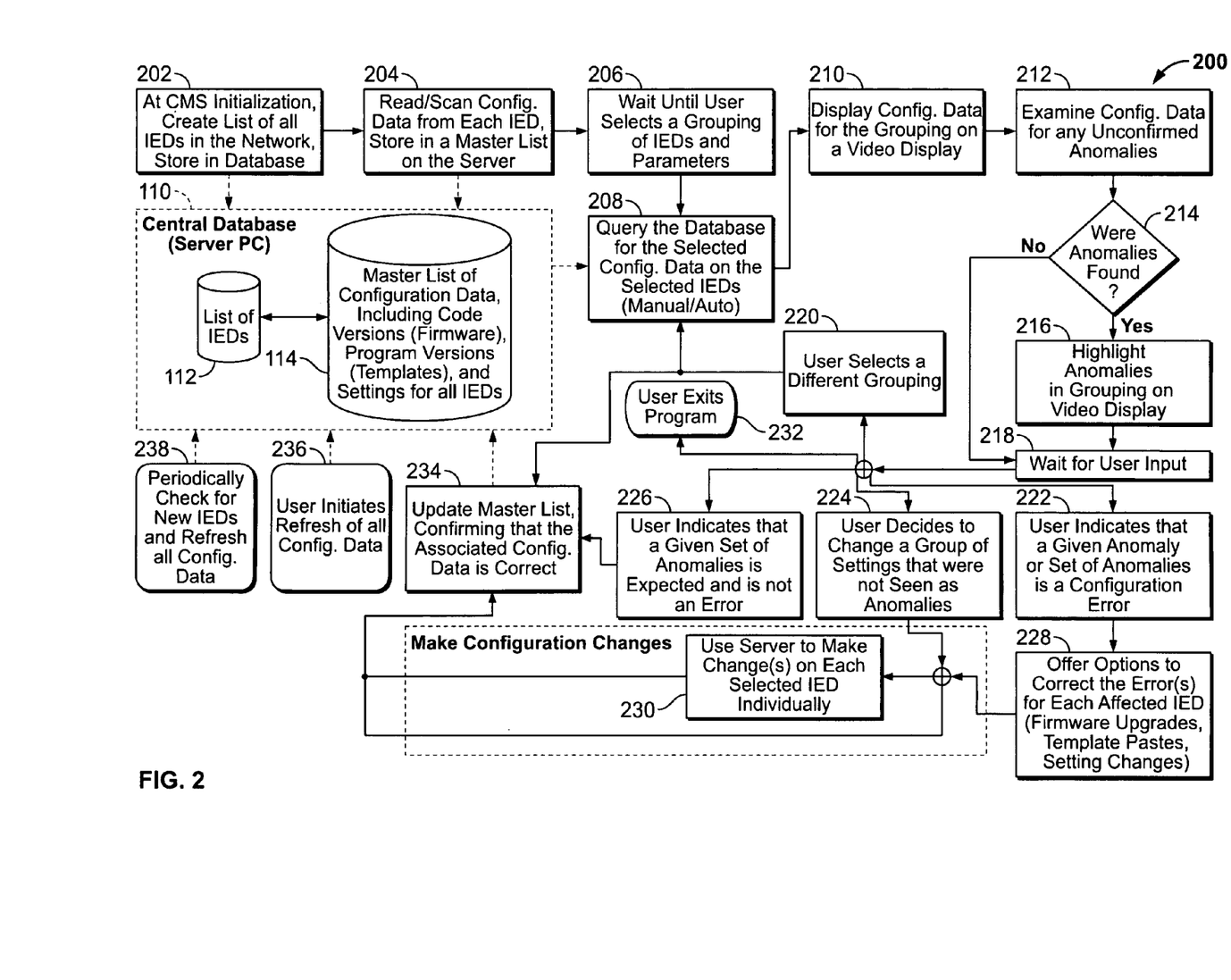
FIG. 2 is a flow chart diagram of an example configuration management algorithm that analyzes configuration parameters read from the devices in the electrical system shown in FIG. 1 and automatically determines any anomalies among the configuration parameters.

FIG. 2 illustrates a flow chart of an exemplary configuration management algorithm 200, which is executed by a conventional controller or processor (not shown) in the CMS 102. The CMS 102 preferably includes a conventional computer server coupled to a database. Upon initialization of the CMS 102, the configuration management algorithm 200 creates a list of all IEDs in the electrical system 100 that are capable of being detected through the various networks 106a-f in the electrical system 100 (202). To do so, the CMS 102 broadcasts a pulse on the networks 106a-f using appropriate protocols supported by the IEDs 104a-r. For example, in the case of the wireless network 106a, the CMS 102 broadcasts a pulse according to an 802.11x wireless communications protocol, which is seen by the IED 104a and eventually IED 104b when it is added to the electrical system 100. The IEDs 104a-r actively listen for an appropriate pulse, and when they detect it, each IED 104 responds and the response is detected by the CMS 102. The CMS 102 performs handshaking with the IED 104, which sends identification data indicative of the identity of the IED (e.g., type of IED, manufacturer identification information, model information, and the like) to the CMS 102, which stores the identification information associated with each IED in the list of IEDs 112 on the storage device 110.

According to an aspect, the user will have already installed and configured the IEDs 104. In this example, the algorithm 200 intelligently scans the networks 106 in the electrical system 100 to detect the IEDs 104 and to read their configuration parameters automatically. The user can commission a complete solution in a very quick timeframe. The algorithm 200 greatly decreases the amount of time the user spends verifying the configuration of all the IEDs and ensuring that their configurations are consistent and correct. According to another aspect, the user installs a new IED and adds it to a network 106 in the electrical system 100. The algorithm 200 automatically detects the newly added IED, determines the type of IED, adds it to the list of IEDs 112 on the storage device 110, and sends to the newly added IED a framework that configures the configuration parameters of that IED. The auto-detection of configuration parameters of a newly added IED greatly reduces the amount of time the user spends configuring the parameters of a new IED because any deviations from configuration templates or similar IEDs will be flagged quickly and automatically by the algorithm 200 for the user's verification.

The algorithm 200 reads or scans the configuration data (which includes the parameter values) from each of the IEDs 104a-r and stores the configuration parameter values associated with each of the IEDs 104a-r in the master list 114 on the storage device 110 (204). The CMS 102 receives the parameter values from each IED in a similar manner that the CMS 102 receives the identification information as described above. The initial identification of IEDs and their respective configuration data is referred to as the pre-scan mode of operation. The pre-scan creates a "baseline" of identification information and configuration parameters against which subsequent scans can be compared.

The algorithm 200 polls for a user input to determine whether the user has selected a group of IEDs for analysis and/or a specific configuration parameter or configuration parameters for analysis (206). Upon receiving an input from the user selecting a group of IEDs and/or one or more configuration parameters for analysis, the algorithm 200 queries the storage device 110 for the selected configuration parameter values based on the selected group and/or selected configuration parameters (208). The query can be constructed automatically based on the user input or manually by the user.

The output from the storage device 110 is formatted by the algorithm 200 for display on a video display of the CMS 102. The CMS 102 can include a conventional computer, such as a server, a video display, one or more communications interfaces, and one or more input/output devices for interfacing with the user. The algorithm 200 automatically examines for any unconfirmed anomalies the configuration parameter values corresponding to the selected configuration parameter(s) inputted by the user and optionally corresponding to the group of IEDs 104 selected by the user (212). By "unconfirmed," as will be explained below, it is meant that one or more anomalies may have been confirmed and flagged as acceptable, so any such confirmed anomalies will be ignored at this stage. The algorithm 200 automatically determines whether any anomalies were found in the set of parameter values analyzed (214). If no anomalies were found, the algorithm 200 waits for a user input on a desired action (218). Otherwise, if one or more anomalies were found in the data analyzed, the algorithm 200 automatically highlights the one or more anomalies on the video display (216), and waits for the user to input a desired action (218).

The automatic analysis of configuration data and the identification of anomalies in that configuration data is an important aspect of the present disclosure. Examples of how the algorithm 200 automatically determines anomalies in the configuration data include comparing a read configuration parameter from an IED against a configuration template for that IED. If the configuration parameter values read from the IED and the template do not match, then the algorithm 200 determines that an anomaly exists. Alternately, the algorithm 200 can read a number of parameter values from multiple IEDs and identify any parameter value that deviates from the majority of parameter values. For example, if 39 of 40 IEDs have a CT ratio configured to a value of 5000:5, but one of the 40 IEDs has a CT ratio configured to a value of 5:5, the algorithm 200 will flag the latter IED as having an anomalous configuration parameter (in this example, an anomalous CT ratio) and will display the discrepancy. The user can override the anomaly by indicating that it is acceptable or modify the parameter value to 5000:5 manually or via the algorithm 200, to cause that parameter value to be changed in the IED under consideration. Or, if the user realizes that the other 39 IEDs have been configured incorrectly, it is a simple matter for the user to batch change all CT ratios of those 39 IEDs via the algorithm 200.

The user can select among at least five desired actions. The user can select a different group of IEDs 104 for analysis (220) or can exit the configuration management algorithm 200 (232). The user can indicate that a particular anomaly or set of anomalies is a configuration error (222). By highlighting for the user all of the anomalies found in the configuration data, the user can quickly ascertain whether any one or more of those anomalies are actually errors in the configuration of the IED or IEDs 104 under consideration or whether the anomalies are in fact acceptable and not errors. The user can decide to change one or more settings that were not identified by the algorithm 200 as anomalies (224). The settings can include configuration parameters. The user can decide that one or more anomalies are acceptable and are not errors (226).

When the algorithm 200 receives an indication from the user that a particular anomaly or set of anomalies is a configuration error (222), the algorithm 200 offers options to correct the error(s) for each affected IED 104 (228). To do so, the algorithm 200 can consult the configuration parameter template to suggest parameter values to correct the one or more anomalies and copy those values to the affected IED(s) upon receiving confirmation to do so by the user. When the anomaly is related to an outdated firmware or software version, the algorithm 200 can suggest a firmware or software upgrade for the affected IED. The algorithm 200 can cause a configuration setting in the affected IED(s) to be changed.

When either the algorithm 200 or the user indicates that a change to one or more IEDs needs to be made, the algorithm 200 causes the change or changes to the configuration parameters, settings, firmware, or program stored on the affected IED(s) to be made via a server of the CMS 102. The server in the CMS 102 communicates with the IEDs 104 via one or more of the networks 106a-f to cause changes to a particular IED's configuration parameters, settings, firmware, or program to be made.

Once the requested changes to the affected IED(s) 104 have been made, the algorithm 200 updates the master list 114 with the updated information (configuration parameters, settings, firmware version, program version) so that during the next analysis of configuration data, the algorithm 200 does not flag any of the requested changes as anomalies (234). The algorithm can optionally confirm with the user that the configuration data associated with the one or more IEDs under consideration is correct (234).

When the user indicates that one or more anomalies detected by the algorithm 200 are in fact not errors (226), the algorithm 200 updates the master list 114 so that during the next analysis of configuration data, the algorithm 200 does not flag the anomalies indicated by the user as not being errors (234). The algorithm 200 can confirm with the user that the anomalies indicated as non-errors by the user will not be flagged again (234).

The algorithm 200 can receive an indication from the user to initiate a refresh of all configuration data from the IEDs 104 (236). In response, the algorithm 200 reads the configuration parameter values from each of the IEDs 104 in a manner similar to that described in connection with block 204 above. The master list 114 can be updated with the newly refreshed configuration data, which includes the configuration parameter values received from the IEDs 104. Any conflicts between any existing configuration data and new configuration data are flagged and presented to the user for verification. The user can choose to ignore a conflict, flag a conflict as a non-error, or address a conflict by changing a parameter value. In the latter case, the algorithm 200 causes the changed parameter value to be communicated to the subject IED, which in turn modifies the subject configuration parameter to include the changed parameter value.

In addition to receiving a user-initiated request to refresh configuration data, the algorithm 200 can periodically check for new IEDs added to the electrical system 100 and when a new IED is detected, refresh the configuration data for all of the IEDs 104. For example, IED 104b represents an IED that is added to the wireless network 106a. The algorithm 200 will detect this new IED 104b and initiate a refresh of the configuration data in a manner described above in connection with block 204. The algorithm 200 also updates the list of IEDs 112 to include the new IED 104b.

When an IED is added that is not identified by the algorithm 200, the algorithm 200 tries to identify the candidate IED based on existing IED connection information and intelligent guesses regarding the connection information of other IEDs, such as by scanning a serial line for other MODBUS® addresses of the same device type or scanning an IP subnet for other IEDs.

The algorithm 200 is capable of crawling the networks 106a-f to identify any configuration parameters that have changed and notify the user of any such changed parameters. To do so, the algorithm 200 causes configuration data to be read from the IEDs 104 across the respective network 106 and compares the configuration data against the master list 114 for that IED 104.

Three stages of configuration checking have been described above: pre-checking, post-checking, and periodic-checking. The pre-checking (or a pre-scan) stage creates a "baseline" of configuration parameters for comparison at a later time. A post-check or re-interrogation stage occurs when any configuration data has been changed relative to the baseline. A post-check can be triggered manually by the user or automatically by a periodic-check as described above. A periodic check (crawling the network as described above) can be setup by the user to allow the CMS 102 to identify any changes from the baseline created during the pre-check.

The algorithm 200 displays the configuration parameters and their associated IEDs (returned from block 208), and allows the user to sort and group the displayed information by parameter or IED group, for example. The display can resemble a spreadsheet with IEDs and configuration parameters and their associated values organized in rows and columns for easy sorting. As the user sorts or groups the displayed information, the algorithm 200 continues to highlight differences and anomalies within a displayed group, allowing easy identification of errors in the configuration parameters across the entire electrical system 100. The highlighting can be accomplished with different colors (e.g., red for anomalous parameters), larger text, bolded text, and/or blinking or flashing text, alarming, to name just a few. The user can update or change configuration parameter values in one IED at a time or in multiple IEDs at one time. For example, if 13 of 300 IEDs in the electrical system 100 had been incorrectly configured to the wrong clock synchronization method, the user can easily change the clock synchronization method for all 13 IEDs quickly with minimal interaction with the CMS 102. Once the user requests that the clock synchronization method for all 13 IEDs be changed, the CMS 102 takes over and automatically ensures that all 13 IEDs are changed appropriately. The user can request that the CMS 102 re-interrogate the IEDs having this configuration parameter (clock synchronization method) to verify that all 13 IEDs have been successfully changed by visually seeing a lack of highlighting on the 13 IEDs. In other words, when the anomalous parameter was identified by the CMS 102, the 13 IEDs on the display would be highlighted in flashing red text, for example. After the user changes the clock synchronization method for these 13 IEDs to the correct value, the 13 IEDs would no longer be highlighted on the display. All this would occur in real time as the changes are made and confirmed by the CMS 102.

Additional advantages of the CMS 102 will be discussed with reference to specific, non-limiting examples. The CMS 102 can display multiple configuration parameters at one time, such as PT ratios, CT ratios, and demand intervals, and highlight all anomalies at once across all IEDs in the electrical system 100. This allows the user to see at a glance all anomalies in one screen window at the same time. IEDs can be sorted so that those having anomalous parameters are displayed first in the sorted table. Or, IEDs that do not have anomalous parameters can simply be eliminated from the table and only those reporting anomalies are displayed.

The user can identify a configuration parameter flagged as an anomaly by the CMS 102 as acceptable. The user can also include a note with any such flag to indicate that the electrical system 100 uses different PT ratios. Thereafter, those configuration parameters would not be highlighted on the display as anomalous.

The CMS 102 allows the user to unify or update firmware versions or software programs (frameworks) across multiple IEDs 104 in the electrical system 100.

The storage device 110 can store and the CMS 102 can display "last known good" values for the parameters and restore those values when prompted to do so by the user.

The storage device 110 can archive multiple versions of "last known good" configurations for historical purposes. The user can "roll back" to a previous "last known good" configuration version. The configuration versions would be time and date-stamped along with any user-specific comments to make it easier for the user to roll back to a particular configuration version. The CMS 102 would recognize inconsistencies resulting from configuration changes incurred by other software packages or manual configuration changes and store these changes as separate versions that could be reverted to or applied to other IEDs or groups of IEDs.

The CMS 102 allows the user to copy multiple specific configuration parameters of a known "good" IED to multiple other selected IEDs. This greatly decreases the time required to configure a group of IEDs. For example, when the user configures the communications parameters for one IED, it is a simple matter of using the CMS 102 to copy those same communications parameters for other IEDs that need to be configured accordingly. Previously, the user would have had to configure each IED individually, a time consuming and error prone process. An advantage of the CMS 102 is that the user or installer need not necessarily know the specific configuration parameter values for any particular IED. The CMS 102 has a master list 114 of configuration templates that minimizes the likelihood that configuration errors will be made.

The CMS 102 allows the user to quickly configure an IED's identification information. The user would specify a label for a first IED (e.g., METER1) of a group of 10 IEDs, and the CMS 102 auto-increments the label for subsequent IEDs so that the second IED's identification information is configured to be METER2, the third IED's identification information is configured to be METER3, and so forth. For IEDs whose identification information has already been configured, the CMS 102 can detect discrepancies in the auto-numbering scheme. For example, if the user configured two IED's to include identification labels METER1, the CMS 102 detects this duplicate configuration parameter and alerts the user by highlighting the anomalies on the video display.

When a new IED is added to the electrical system 100, the CMS 102 initially flags this IED as having an improper configuration and intelligently discovers that this new IED is not part of the database on the storage device 110. The CMS 102 adds the new IED to the database and prompts the user to group it along with other IEDs if desired and verify the configuration parameters of the new IED.

The CMS 102 can warn the user when an attempt is made to make an incompatible change to a configuration parameter. For example, the CMS 102 can detect that the user is attempting to upgrade a firmware version on a legacy IED that would not support the new firmware version. The master list 114 includes not only the firmware version but also a list of IEDs that would be compatible with each firmware version. When a user attempts to upgrade a firmware version on a particular IED, the CMS 102 consults the master list 114 to determine whether the firmware version is compatible with the IED under consideration. By way of another example, if a user attempts to upload a new configuration template to an IED that is not compatible with that template, the CMS 102 can warn the user of the incompatibility. Again, the master list 110 includes with each configuration template a list of IEDs that are compatible with the template. For example, a configuration template for a PowerLogic® CM4000 circuit monitor would not be compatible with a configuration template for a PowerLogic® ION7550/7650 Power and Energy Meter. If the user were to attempt to upload a configuration template for an ION7xxx meter to a CM4000 circuit monitor, the CMS 102 would alert the user of the incompatibility.

The CMS 102 can also be programmed to set a threshold code version on a firmware or program version that should be running on an IED. When the IED's firmware or program version falls below the threshold code version, the firmware or program can be upgraded to the appropriate version automatically by the CMS 102.

Although the aspects disclosed herein are focused on configuration parameters, the aspects can be extended to operational parameters. For example, many meters in an energy management network need to have similar or the same operational parameters. Large differences or variations in these operational parameters can be identified by the system 102 for future investigation. These differences can indicate configuration or operational problems. Operational problems can include a circuit overload, low voltage, energy theft, inappropriate use during peak energy usage, and the like.

Although the aspects described above refer to the configuration management occurring at a central CMS 102, in other aspects, there can be multiple device configuration servers located throughout the electrical system 100, that carry out the functionality of the CMS 102 at a "local" level. These servers may take the form of a computer, a programmed logic controller (PLC), an remote terminal unit (RTU), or other embedded device.

As shown in FIG. 1, in some cases, the configuration data is communicated across a primary communication link, such as via the wireless network 106a or the serial network 106c. In other cases, the configuration data is communicated across secondary communication links, such as via the primary Ethernet network 106b and the secondary serial network 106e or via the primary phone network 106d and the secondary serial network 106f.

The algorithm 200 shown in FIG. 2 can be visually displayed to the user in the format of a wizard, to help walk the user through the steps for configuring and verifying the configuration of the various IEDs. It can be incorporated into, for example, the PowerLogic® ION® EEM enterprise energy management software available from Schneider Electric.

Instead of or in addition to presenting information to the user via a video display, any results from the analysis of the configuration parameters can be sent as text to a user via email, pager, or text message to an external communications device via any known conventional communications scheme.

Any of these algorithms include machine readable instructions for execution by: (a) a processor, (b) a controller, and/or (c) any other suitable processing device. It will be readily understood that the CMS 102 includes such a suitable processing device. Any algorithm disclosed herein, including the algorithm 200 shown in FIG. 2, may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine readable instructions represented in any flowchart depicted herein may be implemented manually. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

Proper commissioning of a power monitoring system is critical to the safety and proper operation of a facility. Errors in the commissioning or configuration of the devices that represent an "early warning system" of any anomalies or hazardous events perceived on the electrical system can have disastrous and even fatal consequences. These IEDs are typically monitoring very high levels of current that far exceed the threshold for causing fatalities, and it is critical that these IEDs be configured properly with respect to not only themselves but also with respect to other IEDs in the monitoring system. Many installers involved in commissioning these systems are relatively untrained in the complexities of how to configure properly the IEDs across a monitoring system, and ensuring that the configuration of the system is accurate is an inordinately time consuming process. Even experienced installers can easily mis-configure one of hundreds of IEDs that are found in typical moderately-sized monitoring systems. Each individual IED needs to be configured properly, and prior to the present disclosure, there was no easy way for the installer or user to catch improper configurations or inconsistent configurations of existing IEDs or newly added IEDs.

While particular aspects, embodiments, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A method of managing configuration parameters associated with a plurality of intelligent electronic devices in a power monitoring system, comprising:
storing a list of the plurality of intelligent electronic devices (IEDs) in a database, each of the IEDs being operable to sample, collect, or measure, or a combination thereof, one or more operational characteristics of an electrical system being monitored by the power monitoring system;
storing in the database a master list of configuration parameters and their associated parameter values for each of the plurality of IEDs, the configuration parameters of the IEDs being distinct from the operational characteristics of the electrical system, each of the IEDs being configured in accordance with respective ones of the configuration parameters that relate to a configuration of the respective IED;
receiving an indication of a selected configuration parameter from among the configuration parameters;
responsive to the receiving, querying the database for the selected configuration parameter to produce a set of the plurality of IEDs each having the selected configuration parameter;
automatically analyzing the parameter values associated with the selected configuration parameter for each IED in the set of IEDs to determine whether at least one anomalous parameter value exists for any IED in the set of IEDs;
if the automatically analyzing determines that the at least one anomalous parameter value exists, flagging the at least one anomalous parameter value and receiving an indication as to whether to modify the at least one anomalous parameter value; and
responsive to the indication as to whether to modify the at least one anomalous parameter value being an indication to modify the at least one anomalous parameter value, modifying the at least one anomalous parameter value in the master list to produce a modified parameter value.

2. The method of claim 1, wherein the at least one anomalous parameter value is determined by comparing each of the parameter values associated with the selected configuration parameter with a corresponding parameter value in a configuration template stored on the database, and, if the corresponding parameter value differs from the parameter value associated with the selected configuration parameter, flagging the associated IED for the selected configuration parameter as having at least one anomalous parameter value.

3. The method of claim 1, wherein the at least one anomalous parameter value is determined by determining whether any parameter value for any IED in the set of IEDs differs from other parameter values for other IEDs in the set of IEDs, and, if so, flagging the parameter value that differs as the at least one anomalous parameter value.

4. The method of claim 1, responsive to the indication as to whether to modify the at least one anomalous parameter value being an indication not to modify the at least one anomalous parameter value, updating the master list to include an indication that the at least one anomalous parameter value is not an anomalous parameter value.

5. The method of claim 1, further comprising communicating the modified parameter value to the associated IED to cause the modified parameter value to be stored in the associated IED.

6. The method of claim 1, wherein the flagging the at least one anomalous parameter value includes displaying on a video display the at least one anomalous parameter value.

7. The method of claim 1, further comprising:
communicating a signal over a first network to which at least some of the plurality of IEDs are connected, the signal being formatted according to a first communications protocol supported by the at least some of the IEDs;
receiving via the first network responses from the at least some of the IEDs;
instructing via the first network the at least some of the IEDs to transmit their configuration parameters and associated parameter values; and
receiving via the first network from the at least some of the IEDs their configuration parameters and associated parameter values.

8. The method of claim 7, further comprising:
communicating a signal over a second network to which at least others of the plurality of IEDs are connected, the signal being formatted according to a second communications protocol, which differs from the first communications protocol, supported by the at least others of the IEDs;
receiving via the second network responses from the at least others of the IEDs;
instructing via the second network the at least others of the IEDs to transmit their configuration parameters and associated parameter values; and
receiving via the second network from the at least others of the IEDs their configuration parameters and associated parameter values.

9. The method of claim 1, wherein the at least one anomalous parameter value is a plurality of anomalous parameter values, each associated with different ones of the plurality of IEDs, the method further comprising:
receiving an indication of a second modified parameter value;
modifying the master list such that the parameter values for the different ones of the IEDs are modified to correspond to the second modified parameter value; and
causing the second modified parameter value to be communicated to each of the different ones of the IEDs.

10. The method of claim 9, further comprising:
responsive to the causing the second modified parameter value to be communicated, interrogating each of the different ones of the IEDs to verify that the parameter value associated with the selected configuration parameter corresponds to the second modified parameter value.

11. The method of claim 1, wherein the receiving the indication of the selected configuration parameter includes receiving an indication of a group of IEDs, wherein the set of IEDs includes the group of IEDs.

12. The method of claim 1, further comprising periodically polling the plurality of IEDs to receive one or more configuration parameter values and determining whether the received one or more configuration parameter values have changed relative to the master list.

13. The method of claim 12, further comprising:
detecting whether one or more new IEDs have been added to the power monitoring system, and, responsive to the detecting, receiving new parameter values from the one or more new IEDs;
automatically analyzing the new parameter values associated with the selected configuration parameter to determine whether any of the new parameter values are anomalous relative to the parameter values associated with the selected configuration parameter.

14. The method of claim 1, further comprising:
storing in the database a list of versions of firmware or software that is in each of at least some of the plurality of IEDs; and
automatically determining whether any of the versions of firmware or software are outdated, and, if so, causing a new version of firmware or software to be downloaded to at least one of the plurality of IEDs having an outdated version of the firmware or software.

15. A computer program product comprising a non-transient computer readable medium having an instruction set borne thereby, the instruction set being configured to cause, upon execution by one or more controllers, the acts of:
storing a list of a plurality of intelligent electronic devices (IEDs) of a power monitoring system, each of the IEDs being operable to sample, collect, or measure, or a combination thereof, one or more characteristics of an electrical system being monitored by the power monitoring system;
storing a master list of configuration parameters and their associated parameter values for each of the plurality of IEDs, the configuration parameters of the IEDs being distinct from the monitored characteristics of the electrical system, each of the IEDs being configured in accordance with respective ones of the configuration parameters that relate to a configuration of the respective IED;
receiving an indication of a selected configuration parameter from the configuration parameters;
querying the database for the selected configuration parameter to produce a set of the plurality of IEDs each having the selected configuration parameter;
analyzing the parameter values associated with the selected configuration parameter for each IED in the set of IEDs to determine whether at least one anomalous parameter value exists for any IED in the set of IEDs;
if the at least one anomalous parameter value exists, flagging the at least one anomalous parameter value and receiving an indication as to whether to modify the at least one anomalous parameter value; and
responsive to the indication being to modify the at least one anomalous parameter value, modifying the at least one anomalous parameter value in the master list to produce a modified parameter value.

16. The computer program product of claim 15, wherein the determining whether the at least one anomalous parameter value exists includes comparing each of the parameter values associated with the selected configuration parameter with a corresponding parameter value in a configuration template, and, if the corresponding parameter value differs from the parameter value associated with the selected configuration parameter, flagging the associated IED for the selected configuration parameter as having at least one anomalous parameter value.

17. The computer program product of claim 15, wherein the determining whether the at least one anomalous parameter value exists includes determining whether any parameter value for any IED in the set of IEDs differs from other parameter values for other IEDs in the set of IEDs, and, if so, flagging the parameter value that differs as the at least one anomalous parameter value.

18. The computer program product of claim 15, wherein, responsive to the indication being to not modify the at least one anomalous parameter value, updating the master list to include an indication that the at least one anomalous parameter value is not an anomalous parameter value.

19. The computer program product of claim 15, further comprising communicating the modified parameter value to the associated IED to cause the modified parameter value to be stored in the associated IED.

20. The computer program product of claim 15, wherein the flagging the at least one anomalous parameter value includes directing a video display to display the at least one anomalous parameter value.

* * * * *